United States Patent
Korenari et al.

Patent Number: 6,157,507
Date of Patent: Dec. 5, 2000

[54] PERFORMANCE EVALUATION METHOD OF AN MR HEAD AND A MAGNETIC DISK DEVICE WHEREIN THE METHOD IS APPLIED

[75] Inventors: Takahiro Korenari; Toshiyuki Okumura, both of Tokyo, Japan

[73] Assignee: NEC Corporation, Tokyo, Japan

[21] Appl. No.: 09/162,509

[22] Filed: Sep. 29, 1998

[30] Foreign Application Priority Data

Sep. 30, 1997 [JP] Japan ................................ 9-266439

[51] Int. Cl.$^7$ ...................................................... G11B 5/09
[52] U.S. Cl. ................................................................ 360/53
[58] Field of Search .................................. 360/31, 46, 53

[56] References Cited

FOREIGN PATENT DOCUMENTS 4-177603  6/1992  Japan.
4-344302  11/1992  Japan.
7-93723  4/1995  Japan.

*Primary Examiner*—W. Chris Kim
*Attorney, Agent, or Firm*—Foley & Lardner

[57] ABSTRACT

A performance evaluation method of an MR head whereby resolution performance of an MR head can be estimated, an isolated repreoduction wave form V(t) of the MR head is approximated by an equation $V(t)=1/(1+(2t/PW50)^P)$, t denoting time difference from a timing which gives a peak value of the isolated reproduction wave form V(t), and PW50 denoting a half-peak-width where the isolated reproduction wave form V(t) shows more than 50% of the peak value. The resolution performance of the MR head is evaluated according to the order value P of the above equation which gives the most likelihood approximation of the isolated wave form, together with the half-peak-width PW50 relative to a minimum bit-interval to be reproduced by the MR head.

8 Claims, 9 Drawing Sheets

K=PW50(HALF PEAK WIDTH)/BI(MINIMUM BIT INTERVAL)

PERFORMANCE EVALUATION METHOD OF AN MR HEAD AND A MAGNETIC DISK DEVICE WHEREIN THE METHOD IS APPLIED

BACKGROUND OF THE INVENTION

The present invention relates to a performance evaluation method of an MR (Magneto-Resistance) head and a magnetic disk device wherein the method is applied.

Recently, improvement of read/write resolution of a magnetic head is strongly required along with miniaturization and recording capacity enlargement of magnetic recording devices such as a hard disk unit.

In order to reply to this requirement, the MR sensor, which senses resistance variation caused by a magnetic field, has become widely used as a reading element of the magnetic head. This is because the resistance variation of the MR sensor depends only on the magnetic field generated by magnetization transitions recorded on the magnetic disk, being independent of relative speed of the magnetic disk to the MR sensor.

In the MR head, the resistance of the MR sensor varies as a function of magnetic field intensity. Therefore, the output signal of the MR head has a wave form which represents magnetization transitions recorded on the recording medium.

Conventionally, an isolated reproduction wave form V(t), which is obtained when a MR head reads a single magnetization transition, is treated to be represented by following equation, by normalizing it, peak value as 1.

$$V(t)=1/(1+(2t/PW50)^2) \quad (2)$$

Here, t denotes time difference from a timing which gives the peak value of V(t), and a half-peak-width PW50 denotes a time width where V(t) shows more than 50% of the peak value.

Making use of the above equation (2), the BER (Bit-Error-Rate), that is, the rate of error bits to total bits in a reproduced signal, of a magnetic disk device to be designed can be estimated with computer simulation, according to a ratio K of the half-peak-width PW50 to the minimum bit-interval BI (K=PW50/BI) and SN (Signal-Noise) ratio of the reproduced signal.

More concretely, from a reproduction output for a maximum recording density, which is obtained as a linear summation $\Sigma_i V(t+_iBI)$ of the isolated reproduction wave forms of equation (2), the BER is calculated according to the SN ratio for each ratio K, and the designing factors of the magnetic disk device are determined referring to the calculation results. The better is the smaller BER realized with the smaller SN ratio, of course.

The minimum bit-interval BI corresponds to minimum distance between two consecutive magnetization transitions, and so, the half-peak-width PW50 is usually expressed with unit of length being multiplied by relative speed of the MR head to the magnetic disk.

FIG. 9 is a graphic chart illustrating the BER relative to the SN ratio calculated for three values of the ratio K, K=2.0, 2.4 and 2.8, on condition that the reproduction signal is to be processed according o the 8/9 modulation, class IV, partial-response maximum-likelihood PR4ML) decoding method.

As can be understood from the graphic chart of FIG. 9, the ratio K should be small for realizing a required BER, 1.0E-5, for example, with a small SN ratio. The small value of the ratio K means a narrow half-peak-width PW50 for a certain high recording density.

In case the half-peak-width PW50 is not sufficiently narrow, the output amplitude of the reproduced signal is decreased when reading magnetization transitions recorded close to each other, because of interference among the isolated reproduction wave forms, even if a sufficient output amplitude is obtained when reading magnetization transitions recorded separately.

Therefore, the half-peak-width PW50 defined by equation (2) has been used conventionally as the performance evaluation parameter of the MR head for designing magnetic disk devices, and a narrower half-peak-width PW50 has been sought for realizing higher recording density.

However, there are found problems in evaluating performance of the MR heads only according to the half-peak-width PW50.

The first problem is that the required recording density cannot be obtained in some products of the magnetic disk device even where the half-peak-width PW50 of their MR heads are within the designed norm, resulting in a low yield rate and a low productivity. This is because the isolated reproduction wave form representing resolution performance differs a little for each MR head even when the half-peak-width PW50 is the same, and this difference considerably affects the resolution performance of each MR head in case the recording density is high.

The second problem is that the resolution performance of the MR head degrades according to usage in some products of the magnetic disk device, resulting in low reliability of the magnetic disk device. This is because the isolated reproduction wave form may be changed even when the half-peal-width PW50 remains to be the same, along with change of the magneto-resistance characteristic of the MR sensor which may be caused as a result of the recording effect of the MR sensor, for example.

SUMMARY OF THE INVENTION

Therefore, a primary object of the present invention is to provide a performance evaluation method of an MR head whereby resolution performance of an MR head can be estimated exactly. Another object of the invention is to provide a magnetic disk device which can automatically detect resolution performance degradation of its MR head for improving reliability of tile magnetic disk device.

In order to achieve the object, a performance evaluation method of an MR head of the invention comprises steps of:

obtaining an isolated reproduction wave form V(t) by reading a single magnetization transition recorded on a recording medium with the MR head; calculating an order value P which gives a most likelihood approximation of the isolated reproduction wave form V(t) by a following equation, $$V(t)=1/(1+(2t/PW50)^P)$$

t denoting time difference from a timing which gives a peak value of the solated reproduction wave form V(t), and PW50 denoting a half-peak-width where the isolated reproduction wave form V(t) shows more than 50% of the peak value; and evaluating resolution performance of the MR head according to the order value P and the half-peak-width PW50 relative to a minimum bit-interval to be reproduced by the MR head.

In the step of evaluating, the MR head is evaluated to have insufficient resolution performance, when the order value P is more than 2.6 in case where the ratio K of the half-peak-width PW50 to the minimum bit-interval is between 2.0 and 2.4, or when the order value P is more than 2.2 in case where the ratio K is more than 2.4 and not more than 2.8, on condition that reproduction output of the MR head is processed according to a 8/9 modulation, class IV, partial-response maximum-likelihood (PR4ML) decoding method.

The MR head may be evaluated to have insufficient resolution performance, also when the order value P is not more than 2.0 in case where the ratio K is between 2.0 and 2.8.

On condition that reproduction output of the MR head is processed according to a 8/9 modulation, class IV, extended-partial-response maximum-likelihood (EPR4ML) decoding method, the MR head is evaluated to have insufficient resolution performance in the step of evaluating, when the order value P is more than 2.6 in case where the ratio K is not more than 2.6, or when the order value P is more than 2.4 in case where the ratio K is more than 2.6 and not more than 2.8. On this condition, the MR head may be evaluated to have insufficient resolution performance, also when the order value P is not more than 2.0 in case where the ratio K is between 2.0 and 2.8.

The resolution performance of an MR head can be evaluated far more exactly from the isolated reproduction wave form by taking the order value P in consideration than the conventional method, according to the modulation method to be applied and a desired recording density represented by the ratio K.

Therefore, by making use of the performance evaluation method of the invention for evaluating resolution performance of the MR head, a magnetic disk device giving a required recording density can be designed and fabricated with high reliability, improving the yield rate and the productivity of the magnetic disk device.

A magnetic disk device according to the invention comprises:

a fitting calculation section for calculating the order value P from an isolated reproduction wave form generated by an MR head when the MR head reads a single magnetization transition recorded on a magnetic disk; and an evaluation section for evaluating resolution performance of the MR head to be degraded when the order value P becomes out of a predetermined range.

Therefore, the degradation of the resolution performance of an MR head because of change of reproduction characteristics, such as change of magneto-resistance characteristic of its MR sensor according to usage of the MR head, can be detected in its early stage, in the magnetic disk device of the invention, improving reliability of the magnetic disk device.

BRIEF DESCRIPTION OF THE DRAWINGS

The foregoing, further objects, features, and advantages of this invention will become apparent from a consideration of the following description, the appended claims, and the accompanying drawings wherein the same numerals indicate the same or the corresponding parts.

In the drawings.

DETAILED DESCRIPTION OF THE PREFERRED EMBODIMENTS

Now, embodiments of the present invention will be described in connection with the drawings.

In the invention, the isolated reproduction wave form V(t) is approximated by following equation (1), by normalizing its peak value as 1;

$$V(t)=1/(1+(2t/PW50)^P) \quad (1)$$

wherein, t and PW50 denote time difference from a timing which gives the peak value of V(t), and a half-peak-width, that is, a time width where V(t) shows more than 50% of the peak value, respectively, in the same way with the conventional equation (2).

In equation (1) according to the invention, a new parameter P is introduced as an order value of the half-peak-width PW50, and the resolution performance of an MR head is evaluated by a combination of the order value P and the half-peak-width PW50.

Figure 1:
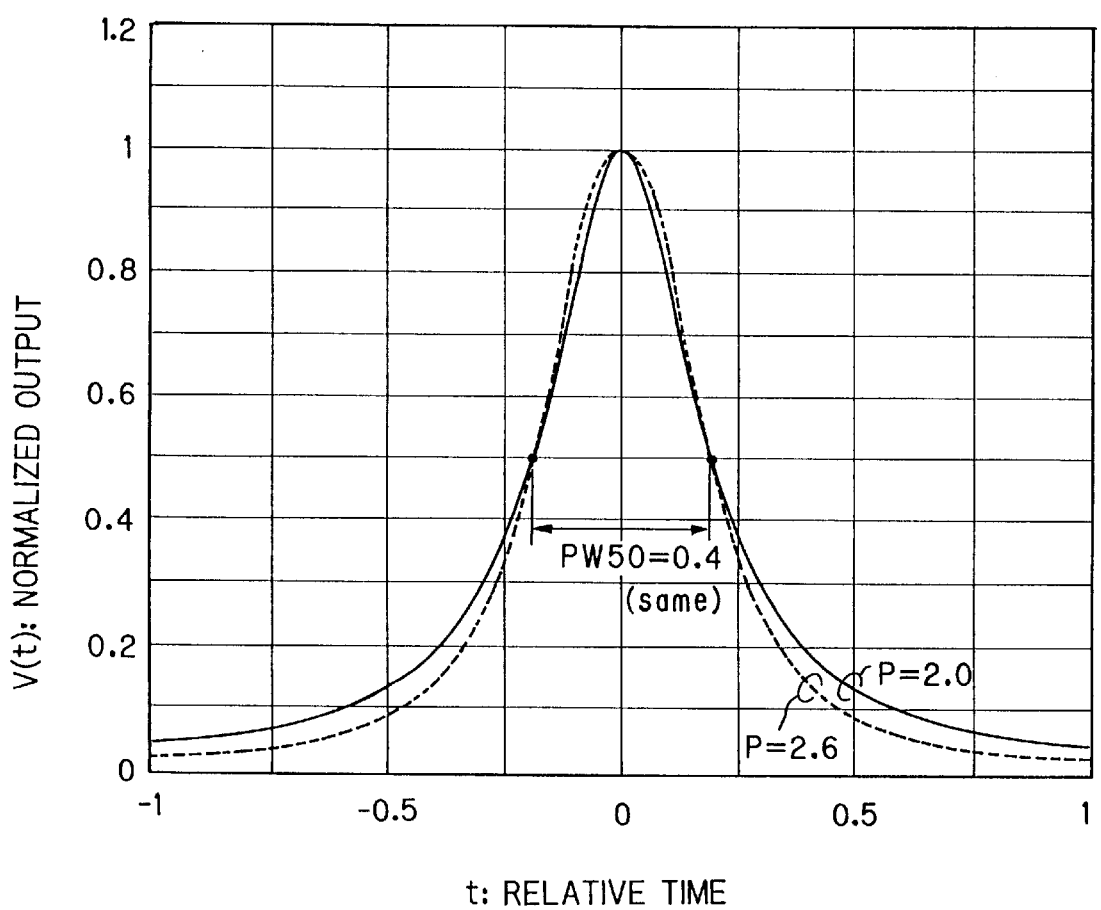
FIG. 1 is a graphic chart for comparing two isolated reproduction wave forms V(t) calculated according to equation of the invention (P=2.6) and according to conventional equation (P=2.0)

FIG. 1 is a graphic chart for comparing two isolated reproduction wave forms V(t) calculated according to equation (1). Both of the two isolated reproduction wave forms have the same half-peak-width PW50 of 0.4, but one (solid line) has an order value P of 2 and the other (dashed line) has another order value P of 2.6. The isolated reproduction wave form of solid line corresponds to that calculated according to the conventional equation (2).

As can be seen from FIG. 1, when the order value P becomes large, the normalized output becomes high in a range where the normalized output is more than 0.5 and becomes low outside the range. In other words, the peak form becomes blunt in a range within the half-peak-width PW50, when the order value P becomes large.

Figure 2:
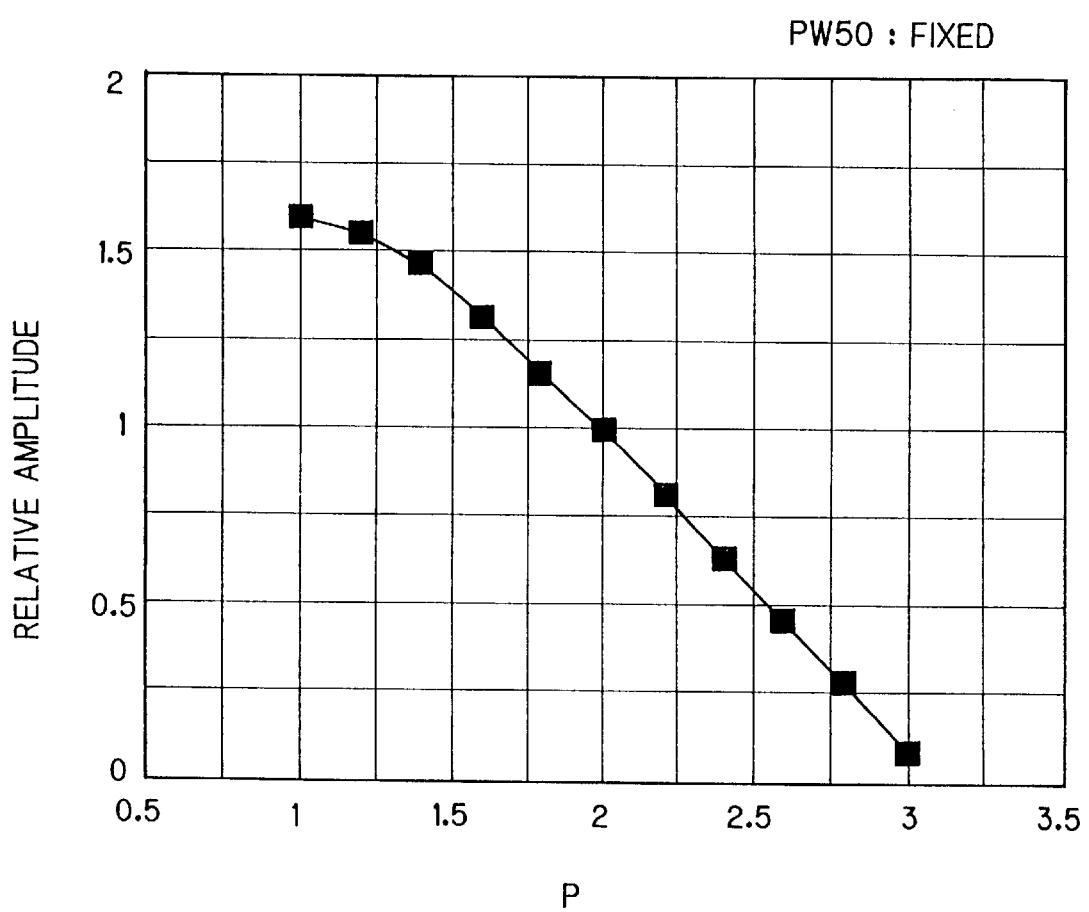
FIG. 2 is a graphic chart illustrates an example of output amplitude variation according to the order value P.

Therefore, the output amplitude of an MR head decreases insignificantly according to increase of the order value P even if the half-peak-width PW50 is the same, when the ratio K (K=PW50/BI, BI being the minimum bit-interval) is high, 2.8, for example, wherein the isolated reproduction wave forms overlap with each other within the range of the half-peak-width PW50. For example, in FIG. 2, which illustrates an example of output amplitude variation relative to output amplitude obtained when the order value P=2, the output amplitude becomes smaller than a half when the order value P=2.6.

In the following paragraphs, some theoretical estimation results of the resolution performance of an MR. head will be described, when the order value P of equation (1) is changed.

Figure 3:
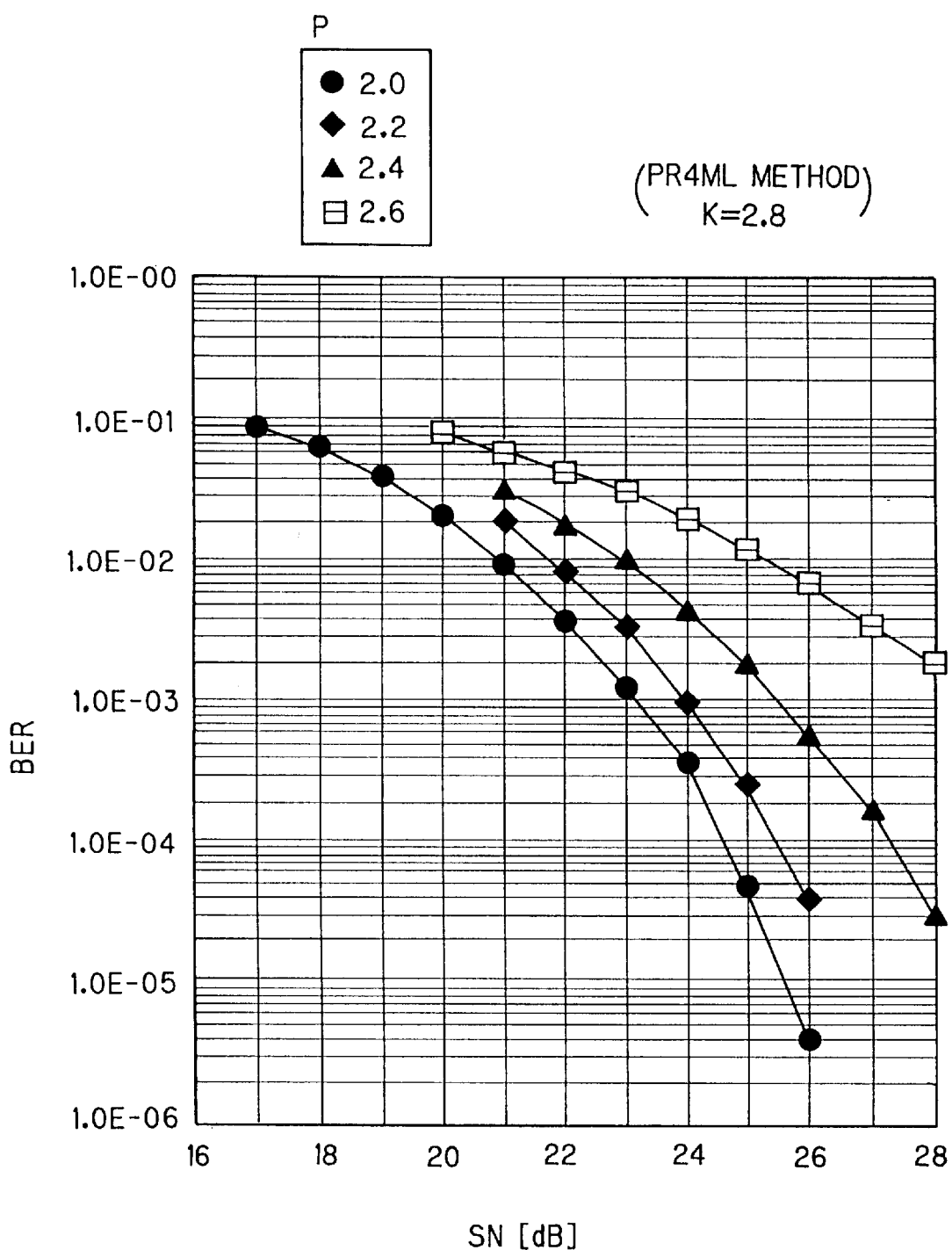
FIG. 3 is a graphic chart illustrating the BER relative to the SN ratio, calculated on condition that the ratio K is fixed to be 2.8, the order value P is changed to be 2.0, 2.2, 2.4 and 2.6, and the reproduction output is to be processed according to the 8/9 modulation, class IV, partial-response maximum-likelihood (PR4ML) decoding method.

FIG. 3 is a graphic chart illustrating the BER relative to the SN ratio, calculated on condition that the ratio K is fixed to be 2.8, the order value P is changed to be 2.0, 2.2, 2.4 and 2.6, and the reproduction output is to be processed according to the 8/9 modulation, class IV, partial-response maximum-likelihood (PR4ML) decoding method.

As shown in FIG. 3, the BER changes when the order value P changes, even when the ratio K, that is, the half-peak-width PW50 relative to the recording density is the same. For obtaining the BER within 1.0E-04, for example, the SN ratio should be higher than 25.5 dB when the order value P=2.2 and should be higher than 27.5 dB when P=2.4, while the same BER is attained with the SN ratio higher than 24.5 dB when the order value P=2.0.

Figure 4:
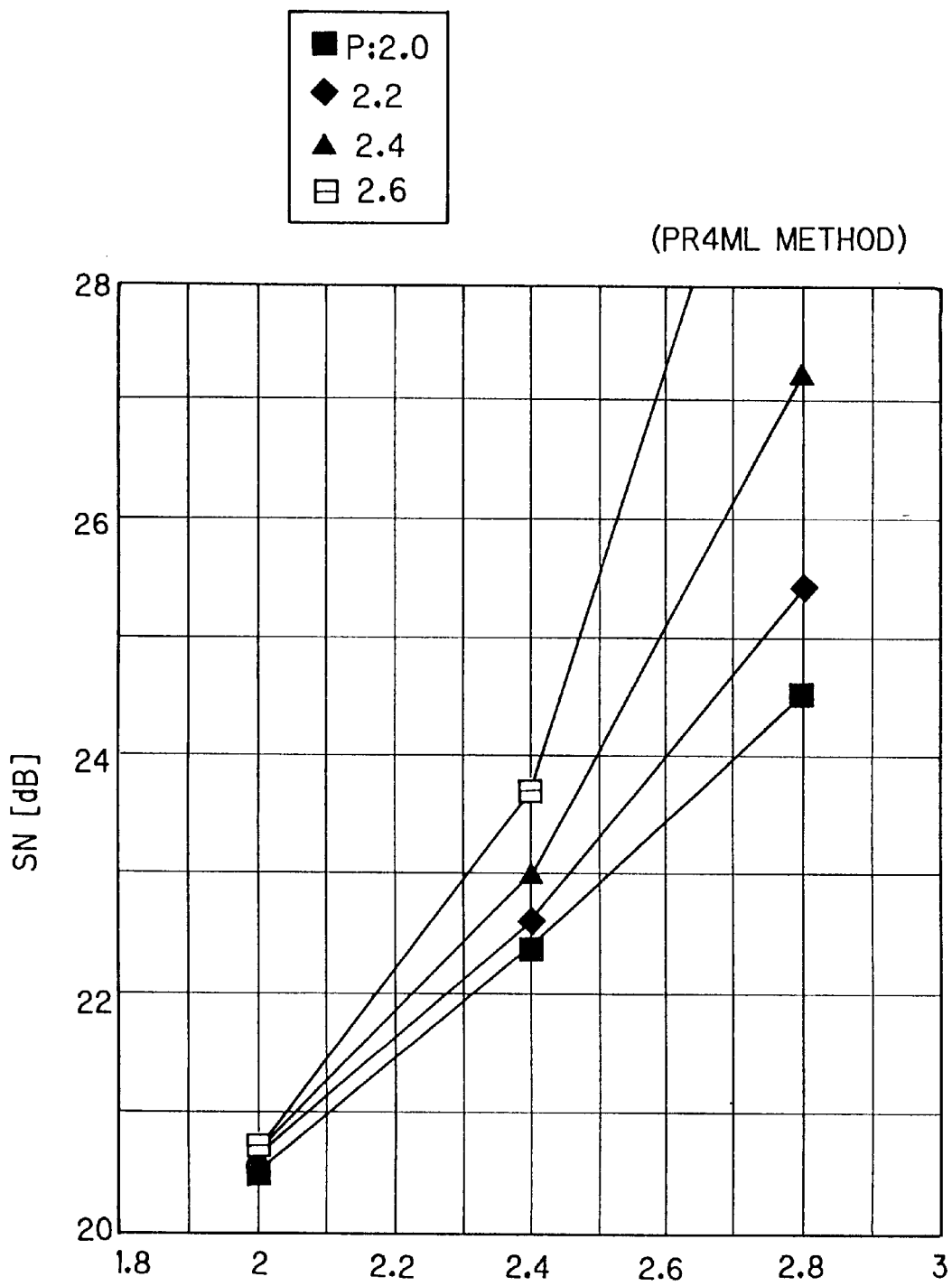
FIG. 4 is a graphic chart wherein necessary SN ratios for obtaining the BER of 1.0E-04 are plotted by changing the ratio K to be 2.0, 2.4 and 2.8, on condition that the reproduction output is to be processed according to the PR4ML decoding method.

FIG. 4 is a graphic chart wherein necessary SN ratios for obtaining the BER of 1.0E-04 are plotted, which are estimated by the same calculation with FIG. 3 performed by changing the ratio K to be 2.0, 2.4 and 2.8.

As can be under stood from FIG. 4, the necessary SN ratio differs little when the ratio K is 2. However, when the ratio K becomes high, dependence of the necessary SN ratio on the order value P becomes large. According to FIG. 4, it can be said that the order value P is preferable to be smaller than 2.6 when the ratio K is lower than 2.4, and to be smaller than 2.2 when the ratio K is between 2.4 and 2.8, on condition the reproduction output is processed according to the 8/9 modulation, class IV, partial-response maximum-likelihood (PR4ML) decoding method. By controlling the order value P within the above range, increase of the necessary SN ratio can be restricted within 1 dB compared to the SN ratio required when the order value P is 2.0.

Figure 5:
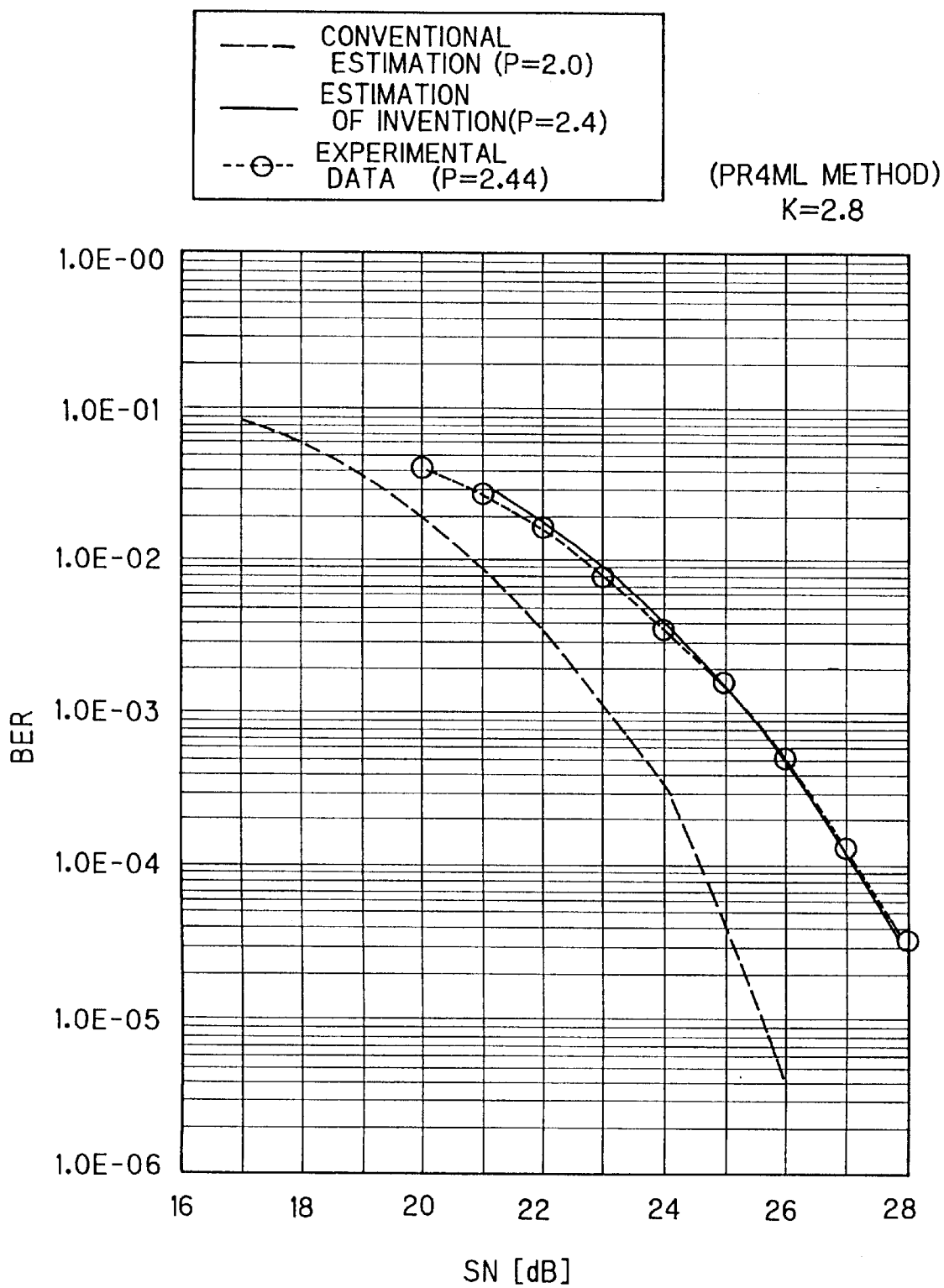
FIG. 5 is a graphic chart illustrating experimental data, conventional estimation and the estimation according to the invention of the BER relative to the SN ratio, compared on condition that the reproduction output is to be processed according to the PR4ML decoding method.

Now, comparison with an experimental data will be described referring to a graphic chart of FIG. 5 illustrating the BER relative to the SN ratio.

The experimental data expressed by a dot line marked with circles in FIG. 5 is measured on following conditions.

A recording medium comprising a CoCrTa thin film having coercivity of 2400 oersted and residential magnetization/film depth product of 125 gauss·$\mu$m and an MR head having a read-gap length of 0.32 $\mu$m are applied. The relative speed of the recording medium to the MR head and the flying height of the MR head are set to be 12.7 m/s and 45 nm, respectively.

Data having a recording density corresponding to the ratio K of 2.8 are read out and processed according to the 8/9 modulation, class IV, partial-response maximum-likelihood (PR4ML) decoding method, wherefrom the BER is measured.

At the same time, the isolated reproduction wave form generated by a single magnetization transition is measured, which is sampled with a sampling frequency of 1 GHz and fitting to equation (1) is analyzed in digital. From the analysis, the order value P of 2.44 is obtained.

As shown in FIG. 5, the estimation results according to the conventional method expressed by a dashed line, wherein the order value P is assumed to be 2.0, differs considerably from the experimental data, estimating the BER. too low. On the other hand, the estimation results according to the invention expressed by a solid line, wherein 2.4 is applied to the order value P, coincides well with the experimental data, giving exact estimation of the BER.

As heretofore described, by taking the order value P, which is obtained by applying equation (1) for analyzing the isolated reproduction wave form, in consideration together with the half-peak-width PW50, the resolution performance of an MR head can be estimated far more exactly than the conventional method.

Figure 6:
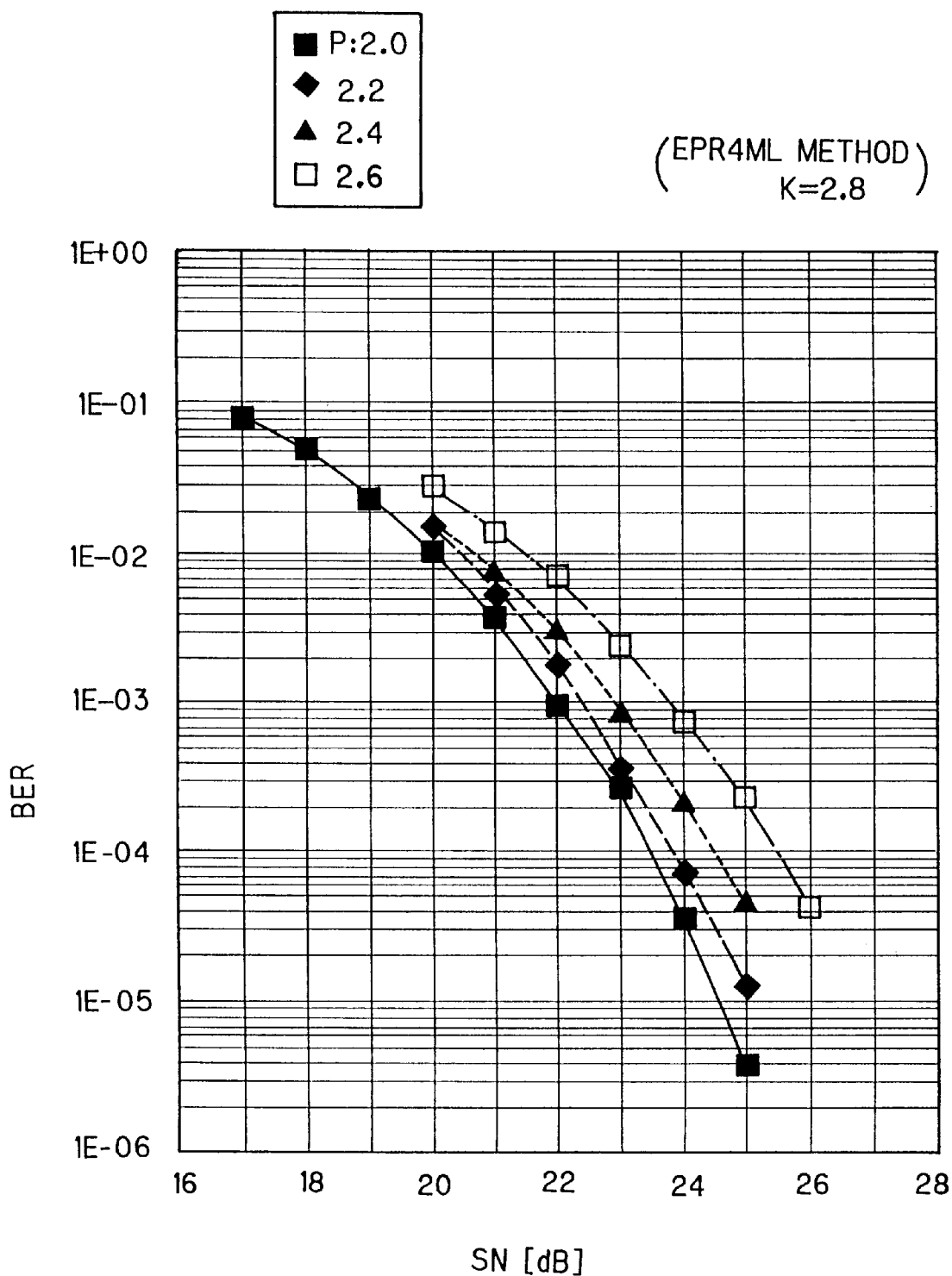
FIG. 6 is a graphic chart illustrating the BER relative to the SN ratio calculated on the same condition with FIG. 3, when the 8/9 modulation, class IV, extended-partial-response maximum-likelihood (EPR4ML) decoding method is applied.

FIG. 6 is a graphic chart illustrating the BER relative to the SN ratio calculated on the same condition with FIG. 3, that is, K=2.8, P=2.0, 2.4 and 2.6, except for the decoding method. In FIG. 6, the 8/9 modulation, class IV, extended-partial-response maximum-likelihood (EPR4ML) decoding method is applied.

In FIG. 6 also, the BER relative to the SN ratio varies depends on the order value P, even when the ratio K, that is, the half-peak-width PW50 relative to the recording density is the same. For obtaining the BER of 1.0E-04, the SN ratio is sufficient to be higher than 23.5 dB when P=2.0. However, the lower limit of the SN ratio for obtaining the same BER becomes higher according to the order value P in a range where the order value P is larger than 2.0, such as 23.8 dB when P=2.2, 24.5 dB when P=2.4, and 25.5 dB when P=2.6.

Figure 7:
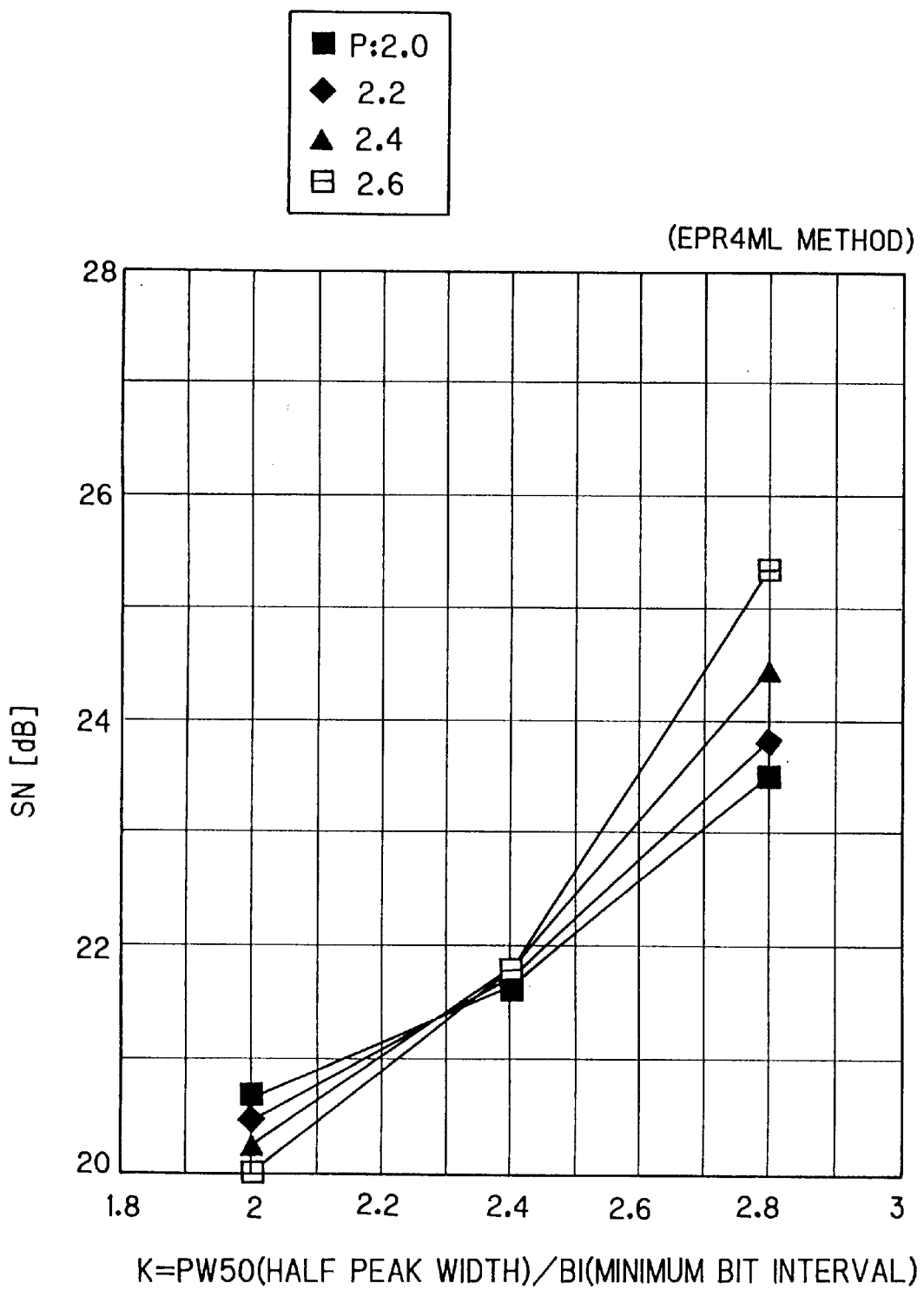
FIG. 7 is a graphic chart wherein necessary SN ratios for obtaining the BER of 1.0E-04 are plotted in the same way with FIG. 4, in case where the EPR4ML decoding method is applied.

FIG. 7 is a graphic chart wherein necessary SN ratios for obtaining the BER of 1.0E-04 are plotted in the same way with FIG. 4, in case where the 8/9 modulation, class IV, extended-partial-response maximum-likelihood (EPR4ML) decoding method is applied.

The necessary SN ratio differs little when the ratio K is 2.4. However, dependence of the necessary SN ratio on the order value P becomes large when the ratio K becomes high, in the same way with FIG. 4. From FIG. 7, in the case where the 8/9 modulation, class IV, extended-partial-response maximum-likelihood (EPR4ML) decoding method is applied, it can be said that the order value P is preferable to be smaller than 2.6 when the ratio K is lower than 2.6, and to be smaller than 2.4 when the ratio K is between 2.6 and 2.8. By controlling the order value P within the above range, increase of the necessary SN ratio can be restricted within 1 dB compared to the SN ratio required when the order value P is 2.0.

As heretofore described, the resolution performance of an MR head can be evaluated far more exactly from the isolated reproduction wave form by talking the order value P of the equation (1) in consideration than the conventional method, according to the modulation method to be applied and a desired recording density represented by a ratio K of the half-peak-width PW50 to a desired minimum bit-interval. Therefore, by making use of the performance evaluation method of the invention for evaluating resolution performance of the MR head, a magnetic disk device giving a required recording density can be designed and fabricated with high reliability, improving the yield rate and the productivity of the magnetic disk device.

Figure 8:
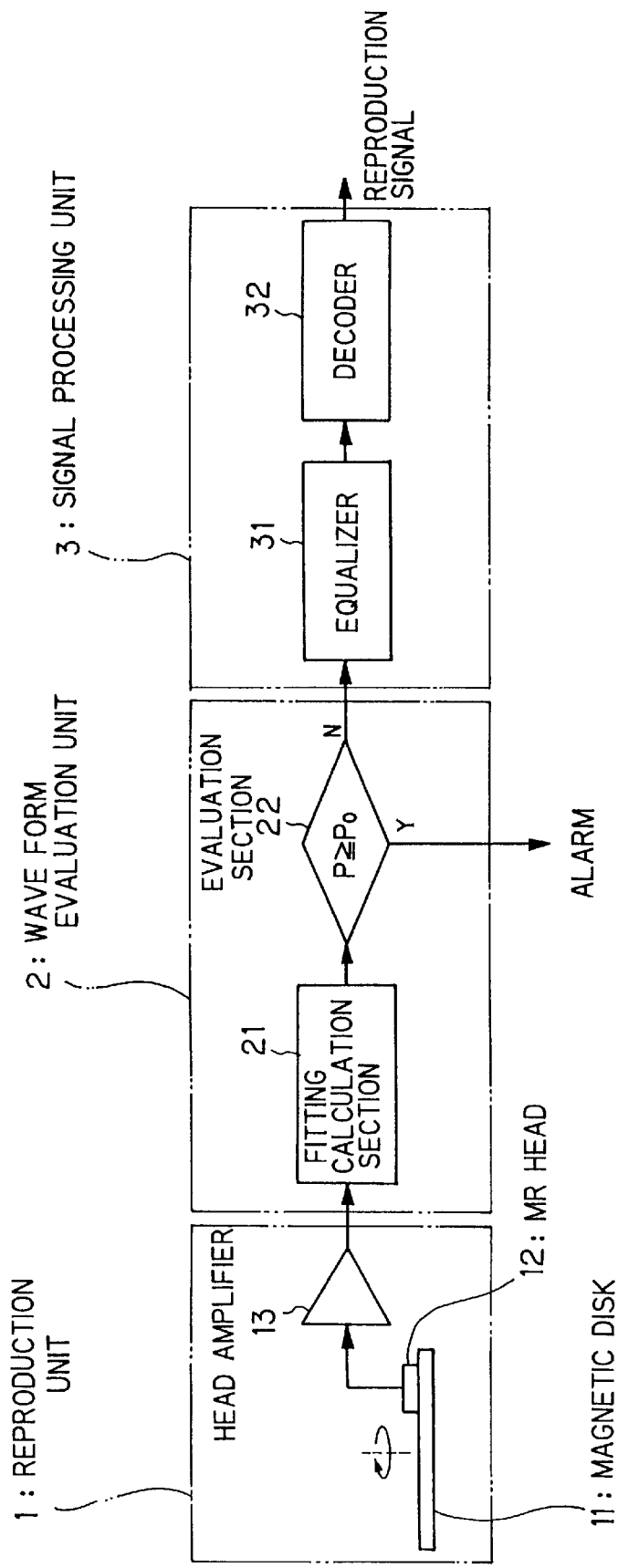
FIG. 8 is a block diagram illustrating an embodiment of a magnetic disk device according to the invention.
Figure 9:
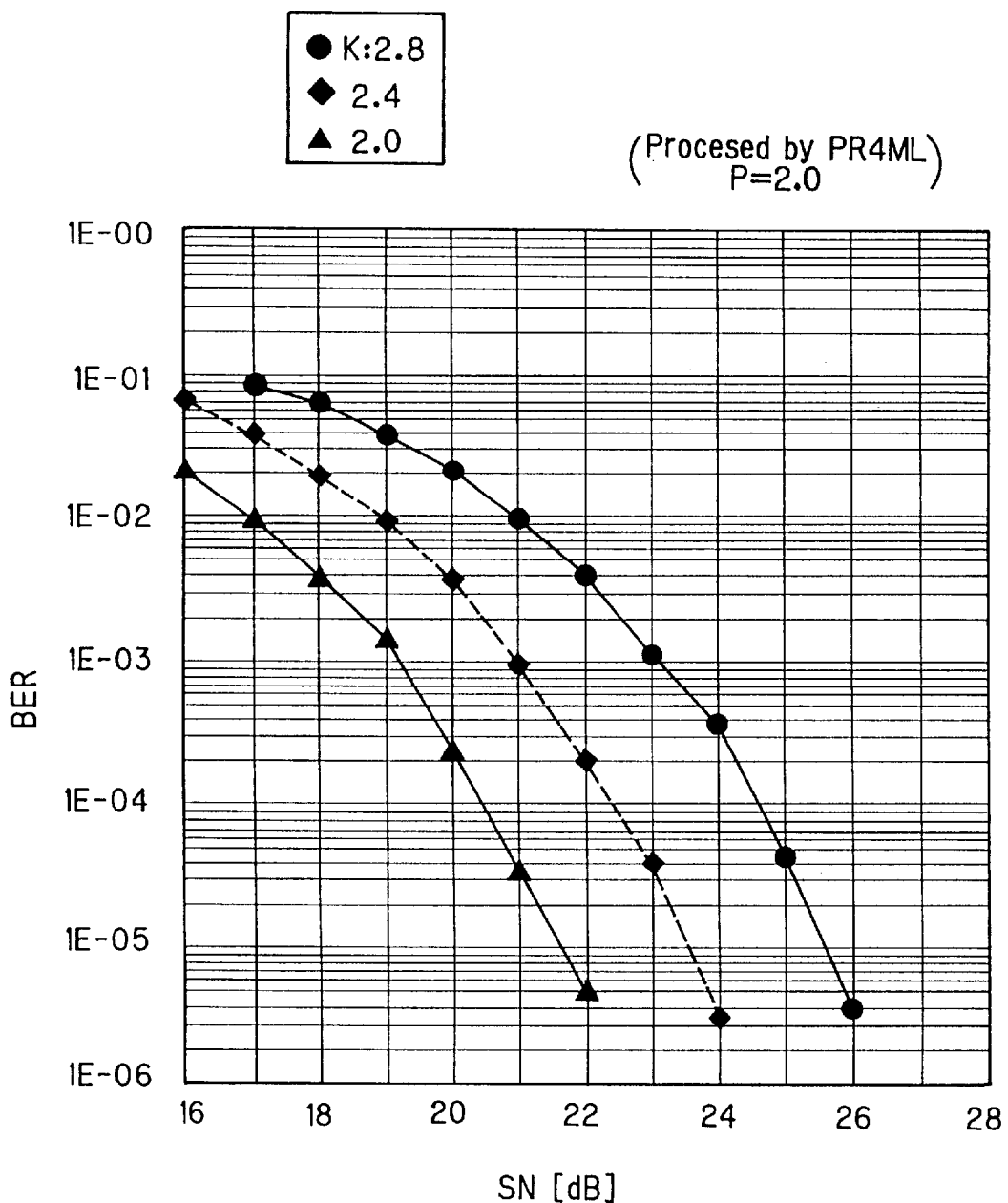
FIG. 9 is a graphic chart illustrating the BER relative to the SN ratio calculated according to the conventional method for K=2.0, 2.4 and 2.8, on condition that the reproduction signal is to be processed according to the PR4ML decoding method.

Now, an embodiment of a magnetic disk device according to the invention is described referring to a block diagram of FIG. 8.

The magnetic disk device of FIG. 8 comprises;

a reproduction unit 1 having a magnetic disk 11, an MR head 12 for generating reproduction output by reading information recorded on the magnetic disk 11 and a head amplifier 13 for linearly amplifying the reproduction output, a wave form evaluation unit 2 having a fitting calculation section 21 for calculating the order value P from an isolated reproduction wave form output by the reproduction unit 1 when the MR head reads a single magnetization transition recorded on the magnetic disk 11, and an evaluation section 22 for outputting an alarm signal when the order value P is not in a predetermined range, and a signal processing means 3 having an equalizer 31 for processing the reproduction output amplified by the head amplifier 13 and delivered through the wave form evaluation unit 2 when the order value P is in the predetermined range, and a decoder 32 for outputting a reproduction signal by decoding the reproduction output processed by the equalizer 31.

The isolated reproduction wave form generated by the MR head 12 is linearly amplified by the head amplifier 13 and supplied to the wave form evaluation unit 2.

The fitting calculation section 21 of the wave form evaluation unit 2 converts the isolated reproduction wave form into digital data by sampling with a high frequency, and performs fitting of the digital data to the equation (1) for calculating the half-peak-width PW50 and the order value P of the isolated reproduction wave form. In the fitting, parameters of the equation (1) such as a peak value of the isolated reproduction wave form V(t), a phase giving the peak value or a half-peak-width PW50 are calculated. Applying these parameters into the equation (1), the order value P which gives the most likelihood approximation of the isolated reproduction wave form V(t) by the equation (1) is calculated by a least-mean-square method, for example.

When the order value P calculated by the fitting calculation section 21 is not smaller than a predetermined threshold value $P_0$, the evaluation section 22 outputs an alarm signal, and otherwise, the reproduction output amplified by head amplifier 13 is supplied to the signal processing unit 3 to be processed for outputting a reproduction signal, in the same way with an ordinary magnetic disk device.

As above described, the degradation of the resolution performance of an MR head because of change of reproduction characteristics, such as change of magneto-resistance characteristic of its MR sensor according to usage of the MR head, can be detected in its early stage, by providing the wave form evaluation unit 2 in the magnetic disk device of the invention, improving reliability of the magnetic disk device.

In the embodiment of FIG. 8, the wave form evaluation unit 2 is provided between the reproduction unit 1 and the signal processing unit 3. However, the wave form evaluation unit 2 may be connected to the reproduction unit 1 for discriminating the order value P when a control unit (not depicted in the drawings) of the magnetic disk device detects something abnormal in the reproduction signal, for example, by connecting the signal processing unit 3 directly to the reproduction unit 1.

What is claimed is:

1. A performance evaluation method of an MR (Magnetic-Resistance) head comprising:

obtaining an isolated reproduction wave form V(t) by reading a single magnetization transition recorded on a recording medium with the MR head;

calculating an order value P which gives a most likelihood approximation of the isolated reproduction wave form V(t) by a following equation, $$V(t)=1/(1+(2t/PW50)^P),$$

t denoting time difference from a timing which gives a peak value of the isolated reproduction wave form V(t), and PW50 denoting a half-peak-width where the isolated reproduction wave form V(t) shows more than 50% of the peak value; and evaluating resolution performance of the MR head according to the order value P and the half-peak-width PW50 relative to a minimum bit-interval to be reproduced by the MR head.

2. A performance evaluation method as recited in claim 1, wherein the MR head is evaluated to have insufficient resolution performance in the step of evaluating, when the order value P is more than 2.6 in case where a ratio K of the half-peak-width PW50 to the minimum bit-interval is between 2.0 and 2.4, or when the order value P is more than 2.2 in case where the ratio K is more than 2.4 and not more than 2.8, on condition that reproduction output of the MR head is processed according to a 8/9 modulation, class IV, partial-response maximum-likelihood (PR4ML) decoding method.

3. A performance evaluation method as recited in claim 2, wherein the MR head is evaluated to have insufficient resolution performance in the step of evaluating, also when the order value P is not more than 2.0 in case where the ratio K is between 2.0 and 2.8.

4. A performance evaluation method as recited in claim 1, wherein the MR head is evaluated to have insufficient resolution performance in the step of evaluating, when the order value P is more than 2.6 in case where a ratio K of the half-peak-width PW50 to the minimum bit-interval is not more than 2.6, or when the order value P is more than 2.4 in case where the ratio K is more than 2.6 and not more than 2.8, on condition that reproduction output of the MR head is processed according to a 8/9 modulation, class IV, extended-partial-response maximum likelihood (EPR4ML) decoding method.

5. A performance evaluation method as recited in claim 4, wherein the MR head is evaluated to have insufficient resolution performance in the step of evaluating, also when the order value P is not more than 2.0 in case where the ratio K is between 2.0 and 2.8.

6. A magnetic disk device having a reproduction unit for generating reproduction output by reading information recorded on a magnetic disk making use of an MR head and a signal processing unit for outputting a reproduction signal by performing signal processing including a wave form equalizing process and a decoding process onto the reproduction output, said magnetic disk device comprising:

a fitting calculation section for calculating an order value P which gives a most likelihood approximation of an isolated reproduction wave form V(t), which is generated by the reproduction unit when the reproduction unit reads a single magnetization transition recorded on the magnetic disk, by a following equation, $$V(t)=1/(1+(2t/PW50)^P),$$

t denoting time difference from a timing which gives a peak value of the isolated reproduction wave form V(t), and PW50 denoting a half-peak-width where the isolated reproduction wave form V(t) shows more than 50% of the peak value; and an evaluation section for evaluating resolution performance of the MR head to be degraded when the order value P becomes out of a predetermined range.

7. The method as recited in claim 1, wherein the order value P is calculated using the least-mean-square method.

8. The magnetic disk drive as recited in claim 6, wherein the fitting calculation section calculates the order value P using the least-mean-square method.

* * * * *